US006399186B2

(12) United States Patent
Matthews et al.

(10) Patent No.: US 6,399,186 B2
(45) Date of Patent: Jun. 4, 2002

(54) COATED AIR DUCT INSULATION SHEETS AND THE LIKE AND THE METHOD OF COATING SUCH SHEETS

(75) Inventors: Kent R. Matthews, Littleton, CO (US); Thomas Louis Mitchell, Anderson, SC (US); James R. Terry, Cleburne, TX (US); Kimberly Noel Ryan, Greenville, SC (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/875,837

(22) Filed: Jun. 6, 2001

Related U.S. Application Data

(62) Division of application No. 09/312,097, filed on May 14, 1999, now Pat. No. 6,284,313.

(51) Int. Cl.[7] .................................................. B32B 3/06

(52) U.S. Cl. ................................ 428/306.6; 428/316.6; 428/411.1

(58) Field of Search ........................... 428/411.1, 306.6, 428/316.6

(56) References Cited

U.S. PATENT DOCUMENTS

| | | | | |
|---|---|---|---|---|
| 3,306,769 A | * | 2/1967 | Hechtman | |
| 4,677,016 A | * | 6/1987 | Ferziger et al. | 427/407.3 |
| 4,990,370 A | | 2/1991 | Terry et al. | |
| 5,211,988 A | | 5/1993 | Morton | |
| 5,487,412 A | | 1/1996 | Matthews et al. | |
| 5,549,753 A | * | 8/1996 | Matthews et al. | 118/316 |
| 6,228,476 B1 | * | 5/2001 | Bogrett et al. | 428/306.6 |

FOREIGN PATENT DOCUMENTS

| | | | |
|---|---|---|---|
| WO | WO 94/25664 | * | 11/1994 |

* cited by examiner

*Primary Examiner*—Erma Cameron
(74) *Attorney, Agent, or Firm*—Robert D. Touslee

(57) ABSTRACT

An on-line method of forming a multilayered coating on a sheet of fibrous or foam insulation, includes: applying a first coating layer of a first coating composition directly to a first major surface of the insulation sheet; heating an exposed major surface of the first coating layer to stabilize the coating composition at the exposed major surface of the first coating layer so that the first coating layer remains an essentially discrete layer when a second coating layer is applied to the exposed major surface of the first coating layer and to only partially cure the coating composition at the exposed major surface of the coating composition so that a second coating layer applied to the exposed major surface of the first coating layer will readily bond to the first coating layer; applying a second coating layer of a second coating composition directly to the exposed major surface of the first coating layer subsequent to heating the exposed major surface of the first coating layer; and heating the insulation sheet and the first and second coating layers, subsequent to the application of the second coating layer, until the first and second coating layers are substantially dried and cured.

6 Claims, 2 Drawing Sheets

COATED AIR DUCT INSULATION SHEETS AND THE LIKE AND THE METHOD OF COATING SUCH SHEETS

This application is a division of application Ser. No. 09/312,097, filed May 14, 1999 now U.S. Pat. No. 6,284,313.

BACKGROUND OF THE INVENTION

The present invention relates to air duct insulation sheets and similar products and to a coating process for coating such products. The air duct insulation sheets and similar products of the present invention have multilayered coatings. These multilayered coatings are applied by a coating process wherein discrete layers of the coating can be specifically formulated to provide the multilayered coating with specific performance characteristics, such as but not limited to, a first layer specifically formulated to provide the multilayered coating with puncture resistance and a second layer formulated to provide the multilayered coating with abrasion resistance.

Fibrous insulation batts and blankets and foam insulation sheets are used as thermal and acoustical insulation in a variety of products such as but not limited to heating, ventilating and air conditioning (HVAC) duct liners, HVAC duct boards, and automotive hood liners. As used herein, the terms "sheet" or "sheets" include both continuous lengths of insulation, such as but not limited to glass fiber blankets typically ranging in length up to about 200 feet and in width from about 3 to 8 feet, and shorter length insulation batts, blankets or boards, such as but not limited to, glass fiber insulation batts, blankets or boards typically ranging in length up to about 10 feet and in width from about 3 to 8 feet.

With respect to HVAC products, such as glass fiber or foam duct liners and duct boards the major surfaces of these insulation sheets which are exposed to the air flow through the air ducts are typically coated with elastomeric coatings. These elastomeric coatings provide relatively smooth interior surfaces on the air ducts that reduce the frictional resistance of the air ducts to the flow of air through the air ducts and the accumulation by the air ducts of airborne dust, particles, viruses, bacteria and pathogens that tend to accumulate in irregularities in the interior surface of the air ducts. In addition, on the fibrous insulation sheets, the elastomeric coatings retard or substantially eliminate the separation of fibers or dust from the fibrous insulations by the flow of air through the air ducts.

The air duct insulation sheets are normally coated on one major surface (the surface which will become the exposed interior surface of the air duct) with an elastomeric aqueous cross-linkable emulsion composition such as an acrylic emulsion. Typically, the elastomeric cross-linkable composition is frothed or foamed prior to its application over the irregular and uneven surface of the insulation sheet in order to form a uniform coating on the major surface of the insulation sheet. When the coating is heat cured, the exposure of the emulsion coating composition to the heat causes the coating composition to lose water and the frothed or foamed coating to collapse (i.e. coalesce and eliminate bubbles from the froth or foam). The heat curing also causes the elastomeric resins of the coating to cross link to a tough thin coating that covers the major surface of the insulation sheet. By way of example, U.S. Pat. No. 4,990,370, issued Feb. 5, 1991, On-Line Surface and Edge Coating of Fiber Glass Duct Liner, discloses one method of applying such coatings to insulation sheets; U.S. Pat. No. 5,211,988, issued May 18, 1993, Method for Preparing a Smooth Surfaced Tough Elastomeric Coated Fibrous Batt, discloses another method of applying such coatings to insulation sheets; and U.S. Pat. No. 5,487,412, issued Jan. 30, 1996, Glass Fiber Airduct With Coated Interior Surface Containing a Biocide, discloses such coatings wherein a biocide is included in the coating to retard or prevent microbiological growth on the interior surface of an air duct.

While these methods of applying coatings to insulation sheets and the insulation sheets produced by these methods perform well, there has remained a need to provide a method of coating insulation sheets and, in particular air duct insulation sheets, that gives the producer greater flexibility in the coating process to improve the coating produced and/or reduce manufacturing costs.

SUMMARY OF THE INVENTION

The method of the present invention forms a multilayered coating on an insulation sheet wherein the coating composition of each discrete layer of the multilayered coating can be specifically formulated to provide the multilayered coating with specific and distinct performance characteristics and/or to reduce costs and each discrete layer can be formed to the thickness required to perform its particular function. Thus, the coated insulation sheets of the present invention, with their multilayered coatings can each be specifically designed to provide required performance characteristics for particular applications with the opportunity to save on manufacturing costs through the formulation of the coating compositions used for different layers and the regulation of the amount of coating materials used to form the different layers.

The method of the present invention is an on-line method of forming a multilayered coating on an insulation sheet in which a first coating layer (e.g. a layer of a first foamed or frothed cross-linkable elastomeric aqueous emulsion coating composition) is applied directly to and substantially uniformly over a first major surface of the insulation sheet. An exposed major surface of the first coating layer is heated to only partially cure and stabilize the coating composition at the exposed major surface of the first coating layer so that the first coating layer remains an essentially discrete layer when a second coating layer is applied to the exposed major surface of the first coating layer and so that a second coating layer applied to the exposed major surface of the first coating layer will readily bond to the first coating layer. A second coating layer (e.g. a layer of a second foamed or frothed cross-linkable elastomeric aqueous emulsion coating composition) is applied directly to and substantially uniformly over the exposed major surface of the first coating layer subsequent to heating the exposed major surface of the first coating layer. The insulation sheet and the first and second coating layers, are heated subsequent to the application of the second coating layer, until the first and second coating layers are substantially dried and cured.

While other coatings can be used, the preferred coating compositions used to form the multilayered coatings of the present invention are cross-linkable, elastomeric aqueous emulsions, such as aqueous acrylic emulsions. A cross-linkable emulsion contains monomers and polymers, some of which have multiple polymerizable sites to effect cross-linking to a three dimensional polymer. The formulations of the coating compositions forming each layer of the multilayered coatings of the present invention can each be distinct and specifically formulated to perform a desired function that enhances the performance of the insulation sheet for its intended application. For example, the first layer can be formulated to be more puncture resistant while the second layer can be formulated to be more abrasion resistant or to include a biocide. In addition, each layer of the multilayered coatings can be formed to the specific thickness desired or required to perform its particular function and control production costs.

Coated insulation sheets are typically cured in convection ovens where the convection currents of hot gases can disturb the exposed surface of the coating to make the surface rougher or more irregular. To provide a smoother exposed surface on the outermost layer of the multilayered coating of the finished product, the exposed surface of the outermost layer of the multilayered coating can be heated (e.g. by infrared heaters or a hot ironing surface), without disturbing the smooth exposed major surface of the outermost coating layer, to stabilize the smooth major surface of the outermost coating layer prior to heating the insulation sheet and the coating layers by convection heating until the first and second coating layers are substantially dried and cured.

DESCRIPTION OF THE PREFERRED EMBODIMENTS

The insulation sheets used in the method of the present invention to form the coated insulation sheets 20 of the present invention are fibrous insulation sheets or foam insulation sheets. While the method and coated insulation sheets 20 of the present invention can be used for other applications, the method and coated insulation sheets of the present invention are particularly suited for making and use as air duct products, such as duct liners or duct boards.

The fibrous insulation sheets (e.g. batts and blankets), coated by the method of the present invention to form the coated insulation sheets of the present invention, are typically glass fiber insulation sheets formed from air laid, randomly oriented, glass fibers. The glass fibers are bonded to each other at their points of intersection, generally by a cured thermosetting resin binder, to form fibrous insulation sheets having a desired flexibility or rigidity and structural integrity. The glass fiber duct liners are generally used to line sheet metal air ducts that are round, flat oval and rectangular in transverse cross section and are more flexible than the glass fiber duct boards. The glass fiber duct boards are generally rigid, provided with a facing sheet, e.g. a foil and scrim facing sheet, on one major surface, and are formed into air ducts that are round, flat oval and rectangular in transverse cross section with the facing sheet forming the outer surface. The duct liners typically run up to about 200 feet in length, range from about 3 to about 6 feet in width; range from about ½ to about 4 inches in thickness, and have densities ranging from about 1 to about 4 pounds per cubic foot. The more rigid duct boards typically have lengths of about 8 to about 10 feet, widths ranging from about 4 to about 8 feet, thicknesses ranging from about ¾ to about 2 inches, and densities ranging from about 3 to about 6 pounds per cubic foot.

The foam insulation sheets, coated by the method of the present invention to form the coated insulation sheets of the present invention, can be polyimide foam or other foam insulation sheets having the desired flexibility or rigidity and structural integrity. The foam insulation sheets are generally used as duct liners to line sheet metal air ducts that are round, flat oval and rectangular in transverse cross section. The foam duct liners typically range up to about 8 feet in length and about 4 feet in width, have thicknesses ranging from about 1 to about 4 inches, and have densities ranging from about 0.25 to about 1 pound per cubic foot.

Figure 5:
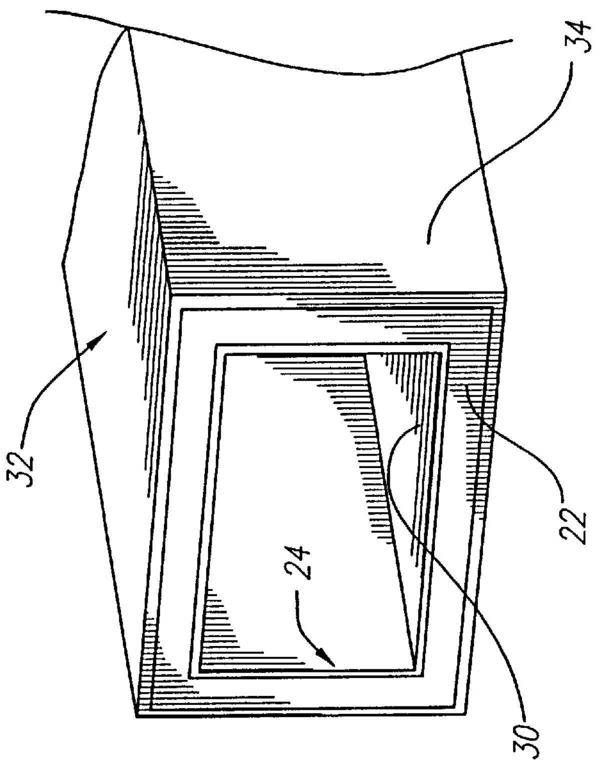
FIG. 5 is a schematic perspective view of an air duct including a coated insulation sheet of the present invention.
Figure 4:
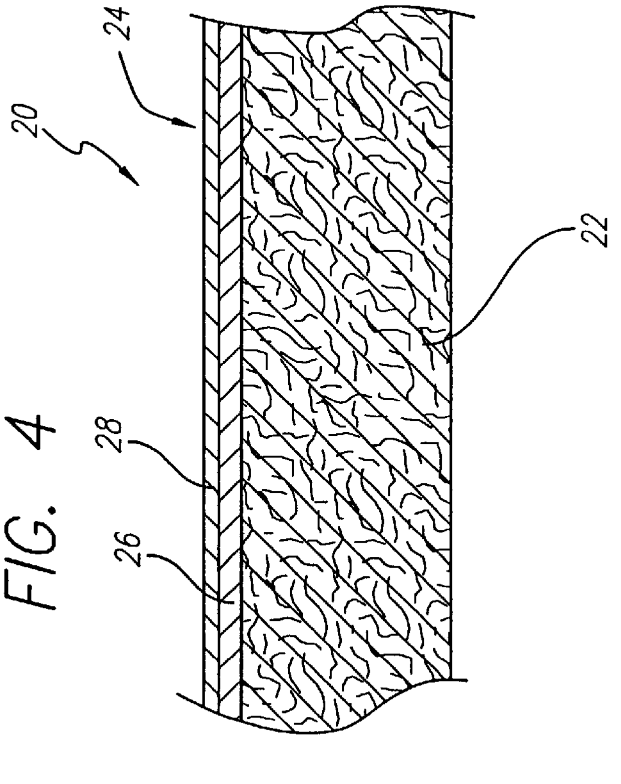
FIG. 4 is a schematic vertical cross section through a portion of a coated insulation sheet of the present invention.

As shown in FIG. 4, the coated insulation sheet 20 of the present invention includes an insulation sheet 22, which is either a fibrous or foam insulation sheet, and a multilayered coating 24 of two or more discrete coating layers only two of which, 26 and 28, are shown. The multilayered coating is preferably coextensive in width and length with a major surface of the insulation sheet 22 that, in a preferred application for this invention shown in FIG. 5, forms an interior surface 30 of an air duct 32 over which an air stream being conveyed by the air duct flows. Where the coated insulation sheet 20 is a duct liner, the outer shell 34 of the air duct is generally made of sheet metal. Where the coated insulation sheet 20 is a duct board, the outer shell 34 of the air duct 32 is generally formed by a facing sheet adhered to the outer surface of the duct board.

Typical coating compositions used in the multilayered coating 24 of the present invention comprise aqueous acrylic emulsions with catalysts to initiate cross-linking of the compositions in response to the application of heat. These coating compositions can be formulated to vary their elasticity, abrasion resistance, rigidity, density, flammability, water resistance, color, etc. These coating compositions may also include ingredients, such as but not limited to pigments, inert fillers, fire retardant particulate additives, organic or inorganic biocides, bactericides, fungicides, rheology modifiers, water repellents, surfactants and curing catalysts.

A typical froth coating used for coating glass fiber batts includes:

| Percent | Weight |
|---|---|
| Aqueous Acrylic Latex Emulsion (Not Pressure Sensitive) | 20–90 |
| Curing Catalyst | 0.1–1.0 |
| Froth Aids | 1–10 |
| Foam Stabilizer | 1–5 |
| Mineral Filler, including Flame Retardants | 0–60 |
| Color Pigments | 0–5 |
| Rheology Control Thickener | 1–6 |
| Fungicide | 0.1–0.3 |

Final solids content is from about 20 to about 85 weight percent. The application viscosity is about 500 to about 15,000 centipoise. Froth density is measured as a "cup weight", i.e. the weight of frothed coating composition in a 16 ounce paper cup, level full. A cup weight of about 55 to about 255 grams is typical.

Figure 3:
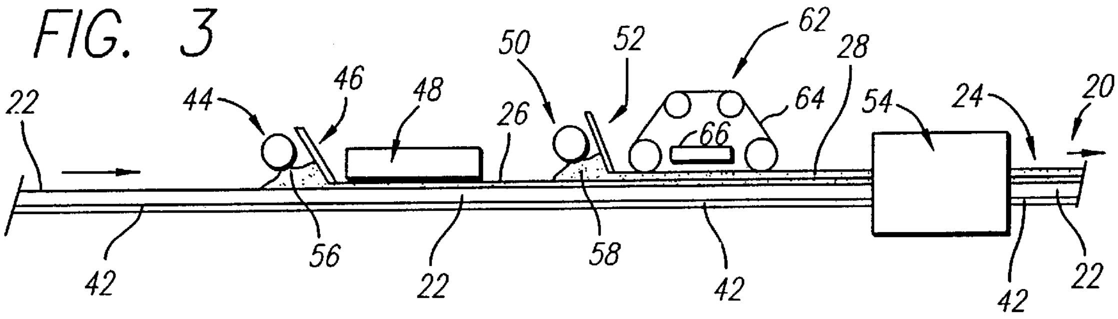
FIG. 3 is a schematic side elevation of a third production line for performing the on-line method of forming a multilayered coating on an insulation sheet, such as but not limited to, an air duct insulation sheet.

As discussed above, with the multilayered coating 24 of the present invention, each discrete layer of the coating, e.g. layers 26 and 28, can be specifically formulated to better perform a specific function. For example, the first discrete layer 26 of the coating can be formulated to be more elastic than the second discrete layer 28 to make the coating more puncture resistant while the second layer 28, which in the embodiment shown in FIG. 3 is the exposed layer, can be formulated to be more abrasion resistant than the first coating layer. Thus, with the multilayered coating 24 of the present invention, there is the opportunity to make the coating 24 more tear and puncture resistant to minimize damage to the coating during the packaging, shipment, handling and installation of the insulation sheets.

Other examples of discrete layers which can be specifically formulated and used in the multilayered coating 24 of the present invention, to provide or enhance specific performance characteristics or reduce the cost of the multilayered coating 24, include but are not limited to, layers formulated with biocides, layers that can fulfill a specific performance characteristic that can made of less expensive coating formulations due to their location in the multilayered coating, layers with improved water resistance, layers with reduced flammability or smoke potential.

In addition, to providing the opportunity to form different layers of the multilayered coating 24 from coating compositions having different formulations, the individual layers 26 and 28 of the multilayered coating 24 can be made of different weights or thicknesses to better perform a specific performance characteristic or to reduce coating costs without sacrificing performance, e.g. the discrete layer 26 can be thicker than the surface layer 28. The multilayered coatings 24 typically range in dry weight from about 6 to about 20 grams per square foot. Thus, by way of example, coating layer 26 could have a dry weight of about 10 grams/sq.ft. and coating layer 28 could have a dry weight of about 4 grams/sq.ft.

Figure 1:
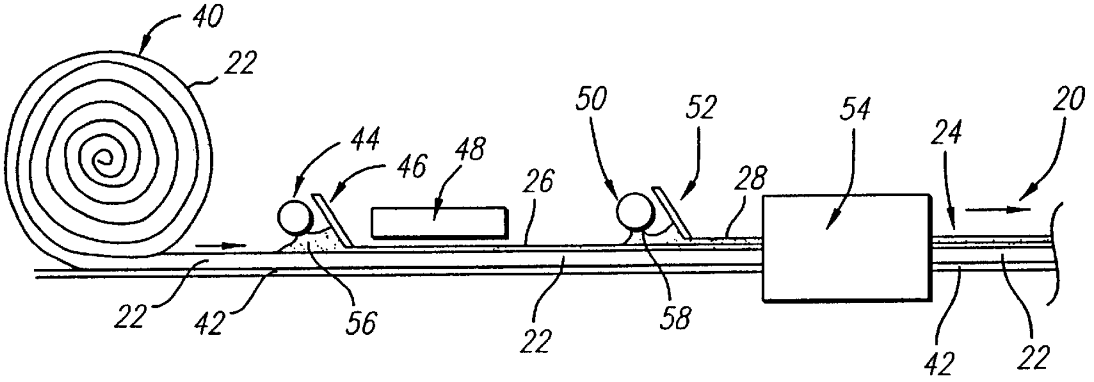
FIG. 1 is a schematic side elevation of a first production line for performing the on-line method of forming a multilayered coating on an insulation sheet, such as but not limited to, an air duct insulation sheet.
Figure 2:
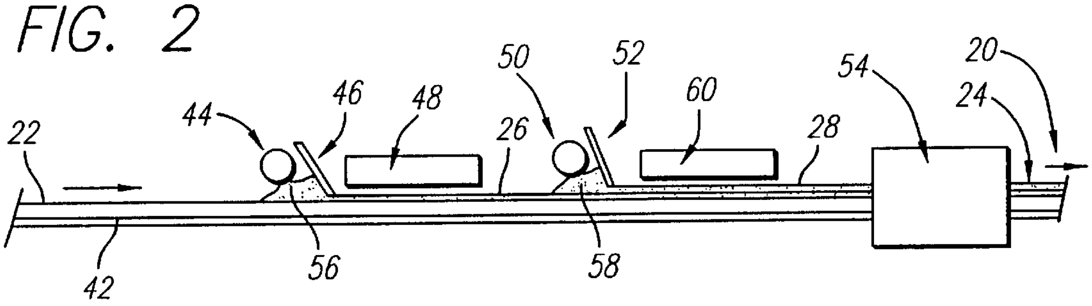
FIG. 2 is a schematic side elevation of a second production line for performing the on-line method of forming a multilayered coating on an insulation sheet, such as but not limited to, an air duct insulation sheet.

FIGS. 1, 2 and 3 schematically show three on-line coating application and curing stations for performing the method of the present invention. While FIG. 1 shows the insulation sheet 22 coming from a roll 40 and FIGS. 2 and 3 show the insulation sheet 22 coming directly from an upstream production line for producing the fibrous or foam insulation sheet 22, it is to be understood that the insulation sheet 22 of FIG. 1 could be coming directly from an upstream production line and that the insulation sheet 22 of FIGS. 2 and 3 could be coming from a roll.

FIG. 1 schematically shows a fibrous or foam insulation sheet 22 being fed sequentially from a roll 40 over a moving conveyor or metal support plate 42 through a first coating applicator 44, a first doctor blade or similar thickness and surface control device 46, a heater 48, a second coating applicator 50, a second doctor blade or similar thickness and surface control device 52, and a curing oven 54. A coating material of a desired composition, e.g. a cross-linkable elastomeric aqueous emulsion, in the form of a froth or foam 56 is applied to the upper major surface of the insulation sheet 22 by the coating applicator 44. The coating material 56 is formed into the first coating layer 26 by the doctor blade or a similar thickness and surface control device 46, e.g. a coating roller. The doctor blade or similar thickness and surface control device 46, spreads or distributes the coating material uniformly over the entire upper major surface of the insulation sheet and forms a smooth exposed surface on the coating layer 26. The insulation sheet 22 coated with the first coating layer 26 of the multilayered coating 24 is then passed through the heater 48 (a heater such as an infrared heater or other heat source that, preferably, does not roughen the smooth surface characteristics imparted to the surface of the first coating layer by the doctor blade 46) to partially cure the coating composition of the first coating layer 26 at the exposed major surface of the first coating layer, e.g. by vaporizing a portion of the water base. By partially curing the coating composition of the first coating layer 26 at the exposed major surface of the first coating layer, the exposed major surface of the first coating layer 26 is stabilized so that the exposed major surface of the first coating layer remains smooth and the first coating layer remains discrete when the second coating layer 28 is applied to the exposed major surface of the first coating layer 26. In addition, with only a partial cure of the exposed major surface of the first coating layer 26, the exposed major surface of the first coating layer 26 remains tacky and forms a good bond with the second coating layer 28 when the second coating layer 28 is applied to the exposed major surface of first coating layer.

After exiting the heater 48, the insulation sheet 22 coated with the first coating layer 26 that has a stabilized but only partially cured (e.g. tacky) exposed surface passes through the second coating applicator 50. A coating material of a desired composition, e.g. a cross-linkable elastomeric aqueous emulsion, in the form of a froth or foam 56 is applied to the exposed major surface of the first coating layer 26 by the coating applicator 50. The coating material 58 is formed into the second coating layer 28 by the doctor blade or a similar thickness and surface control device 52, e.g. a coating roller. The doctor blade or similar thickness and surface control device 52, spreads or distributes the coating material uniformly over the entire upper major surface of the first coating layer 26 and forms a smooth exposed surface on the coating layer 28. As shown, the insulation sheet 22 with the multilayered coating 24 formed by first coating layer 26 and the second coating layer 28 is then passed through a curing oven, such as but not limited to a conventional convection oven, where the layers 26 and 28 of the multilayered coating 24 are cured by vaporizing the water base.

Except for having the insulation sheet 22 fed directly from an upstream production line rather than a roll and for a second heater 60 or ironing apparatus 62, the on-line coating application and curing stations of FIGS. 2 and 3 are the same as the on-line coating application and curing station of FIG. 1.

In the on-line coating and application station of FIG. 2, the second heater 60, which is an infrared heat source or similar heating device which will not disturb or roughen the smooth exposed major surface of the coating layer 28, is included to at least partially cure or cure the smooth exposed major surface of the second coating layer 28 of the multilayered coating 24, e. g. by vaporizing a portion of the water base of the coating 28 at the exposed major surface of the coating layer, prior to introducing the coated insulation sheet 22 into the curing oven 54. By at least partially curing or curing the exposed major surface of the second coating layer 28 of the multilayered coating 24 with the heater 60, the exposed major surface of the coating layer 28, which has been formed with a smooth surface by the doctor blade or similar thickness and surface control device 52, is stabilized prior to introducing the coated insulation sheet 22 into the curing oven 54. Curing ovens typically are convention ovens and, if the exposed major surface of a coating on an insulation sheet is not stabilized prior to introducing the coating into such a convection oven, the heated gas currents flowing within such curing ovens can disturb the upper or exposed major surface of a coating layer to make the exposed surface of the coating layer rougher or more uneven.

In the on-line coating and application station of FIG. 3, the second heater is an ironing apparatus 62 which includes a continuous smooth surfaced, metal ironing belt 64 and a heat source 66, such as infra-red lamps, a radiant gas burner or similar heat source, to heat the ironing belt 64. Like the heater 60 the ironing apparatus is included to at least partially cure or cure the smooth exposed major surface of the second coating layer 28 of the multilayered coating 24, e. g. by vaporizing a portion of the water base of the coating 28 at the exposed major surface of the coating layer, prior to introducing the coated insulation sheet 22 into the curing oven 54. However, in addition to at least partially curing or curing the smooth exposed major surface of the second coating layer 28, the heated ironing belt 64 of the ironing apparatus, which is brought into contact with the exposed major surface of the coating layer 28 and moves in the same direction and at the same speed as the coated insulation sheet 22, may even further smooth the exposed major surface of the second coating layer 28. As with the heater 60, by at least partially curing or curing the exposed major surface of the second coating layer 28 of the multilayered coating 24 with the ironing apparatus 62, the exposed major surface of the coating layer 28 is stabilized prior to introducing the coated insulation sheet 22 into the curing oven 54. Thus, with the upper surface of the coating 24 stabilized any heated gas currents flowing within the curing oven 54 can not disturb the upper or exposed major surface of a coating layer to make the surface of the coating layer 28 rougher or more uneven. The ironing apparatus 62 of FIG. 3 is similar to the ironing apparatuses described in U.S. Pat. No. 5,211,988, issued May 18, 1993, and the disclosure of U.S. Pat. No. 5,211,988, is hereby incorporated herein in its entirety by reference.

While the coating and curing stations of FIGS. 1, 2 and 3 only show two coating layers, layers 26 and 28, being applied to the insulation sheet 22, additional coating applicators, doctor blades or similar thickness and surface control devices, and heaters can be included in the coating and curing stations if additional coating layers are desired in the multilayered coating 24.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation sheet with a multilayered coating, comprising:

an insulation sheet, the insulation sheet having first and second major surfaces, lateral edges and end edges;

a first discrete coating layer formed from a first foamed or frothed cross-linkable elastomeric aqueous emulsion coating composition applied directly to the first major surface of the insulation sheet with the concentration of the coating composition being substantially uniform over the first major surface; and a second discrete coating layer formed from a second foamed or frothed cross-linkable elastomeric aqueous emulsion coating composition which differs from the first coating composition applied directly to a major surface of the first coating layer with the concentration of the coating composition being substantially uniform over the exposed major surface of the first coating layer and an exposed major surface of the coating layer having a generally smooth surface.

2. The insulation sheet with a multilayered coating according to claim 1, wherein:

the insulation sheet is a fibrous air duct insulation sheet.

3. The insulation sheet with a multilayered coating according to claim 1, wherein:

the insulation sheet is a foam air duct insulation sheet.

4. The insulation sheet with a multilayered coating according to claim 1, wherein:

the first coating layer is more elastic than the second coating layer; and the second coating layer is more abrasion resistant than the first coating layer.

5. The insulation sheet with a multilayered coating according to claim 4, wherein:

the insulation sheet is a fibrous air duct insulation sheet.

6. The insulation sheet with a multilayered coating according to claim 4, wherein:

the insulation sheet is a foam air duct insulation sheet.

* * * * *